United States Patent
Saito

(10) Patent No.: US 8,228,513 B2
(45) Date of Patent: *Jul. 24, 2012

(54) IMAGE FORMING APPARATUS

(75) Inventor: Yasunori Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/760,833

(22) Filed: Apr. 15, 2010

(65) Prior Publication Data

US 2010/0195130 A1 Aug. 5, 2010

Related U.S. Application Data

(62) Division of application No. 11/582,503, filed on Oct. 18, 2006.

(30) Foreign Application Priority Data

Dec. 16, 2005 (JP) ................................ P2005-363091
Jul. 31, 2006 (JP) ................................ P2006-208413

(51) Int. Cl.
*G06K 15/00* (2006.01)
*G03G 21/20* (2006.01)
*G03G 15/00* (2006.01)
*B41J 2/01* (2006.01)

(52) U.S. Cl. ........... 358/1.12; 399/92; 399/93; 399/405; 399/107; 399/397; 347/101

(58) Field of Classification Search ............... 358/498
See application file for complete search history.

(56) References Cited

U.S. PATENT DOCUMENTS

| 5,130,743 A | * | 7/1992 | Katoh et al. | ............... | 355/405 |
| 5,612,768 A | * | 3/1997 | Kim et al. | ............... | 399/92 |
| 5,771,103 A | | 6/1998 | Ogino | ............... | 358/437 |
| 6,094,549 A | | 7/2000 | Hiraoka et al. | ............... | 399/93 |

(Continued)

FOREIGN PATENT DOCUMENTS

CN 1630836 6/2005

(Continued)

OTHER PUBLICATIONS

Kokichi Kasai, et al., "Image Forming Apparatus," Unpublished U.S. Appl. No. 11/588,285, filed Oct. 27, 2006.

*Primary Examiner* — Hilina S Kassa
(74) *Attorney, Agent, or Firm* — Morgan, Lewis & Bockius LLP

(57) ABSTRACT

An image forming apparatus includes a recording-medium stacking portion, a recording-medium ejection portion and a suctioning/exhausting unit. The recording-medium stacking portion is provided in a body portion or an upper portion of the image forming apparatus. The recording-medium stacking portion stacks recording media on which respective images are formed thereon. The recording-medium ejection portion ejects the recording medium in a recording-medium ejection direction to the recording-medium stacking portion. The suctioning/exhausting unit is located with respect to the recording-medium stacking portion in a direction, which is perpendicular to the recording-medium ejection direction and parallel to a surface of the recording medium staked on the recording-medium stacking portion. The suctioning/exhausting unit suctions air emitted from the recording medium, which is ejected from the recording-medium ejection portion onto the recording-medium stacking portion. The suctioning/exhausting unit exhausts the suctioned air through a filter.

16 Claims, 11 Drawing Sheets

U.S. PATENT DOCUMENTS

| | | | | |
|---|---|---|---|---|
| 6,115,564 | A * | 9/2000 | Morimoto | 399/92 |
| 6,173,132 | B1 * | 1/2001 | Kida et al. | 399/44 |
| 6,266,498 | B1 * | 7/2001 | Oda et al. | 399/92 |
| 6,327,447 | B1 * | 12/2001 | Nakano et al. | 399/92 |
| 6,594,456 | B2 * | 7/2003 | Kimizuka et al. | 399/92 |
| 6,801,742 | B1 * | 10/2004 | Mochimaru et al. | 399/309 |
| 6,907,206 | B2 * | 6/2005 | Hattori et al. | 399/90 |
| 7,003,242 | B2 * | 2/2006 | Kida | 399/92 |
| 7,020,411 | B2 * | 3/2006 | Awaya | 399/92 |
| 7,027,752 | B2 * | 4/2006 | Yon et al. | 399/93 |
| 7,061,637 | B2 * | 6/2006 | Mochimaru et al. | 358/1.15 |
| 7,090,951 | B2 * | 8/2006 | Matsunaga et al. | 430/45.51 |
| 7,136,613 | B2 * | 11/2006 | Sato et al. | 399/299 |
| 7,274,892 | B2 * | 9/2007 | Awaya | 399/92 |
| 7,313,342 | B2 * | 12/2007 | Katayama et al. | 399/93 |
| 7,603,051 | B2 | 10/2009 | Kasai | 399/93 |
| 7,668,476 | B2 | 2/2010 | Kasai et al. | 399/93 |
| 2004/0131378 | A1 * | 7/2004 | Hattori et al. | 399/90 |
| 2004/0234301 | A1 * | 11/2004 | Sato et al. | 399/299 |
| 2005/0074255 | A1 | 4/2005 | Awaya | 399/92 |
| 2005/0135835 | A1 | 6/2005 | Park et al. | 399/93 |
| 2006/0051123 | A1 * | 3/2006 | Awaya | 399/92 |
| 2007/0110469 | A1 | 5/2007 | Kasai | 399/93 |
| 2007/0121142 | A1 | 5/2007 | Kasai et al. | 358/1.12 |

FOREIGN PATENT DOCUMENTS

| | | |
|---|---|---|
| JP | 2002-91270 | 3/2002 |
| JP | 2002-123138 | 4/2002 |
| JP | A-2002-229420 | 8/2002 |
| JP | A-2003-107978 | 4/2003 |
| JP | 2003-295740 | 10/2003 |
| JP | A-2003-307996 | 10/2003 |
| JP | 2004-240270 | 8/2004 |
| JP | A-2005-099880 | 4/2005 |
| JP | 2005-126191 | 5/2005 |
| JP | 2005-338675 | 12/2005 |
| JP | A-2006-330398 | 12/2006 |
| WO | WO 03/069415 | 8/2003 |

* cited by examiner

IMAGE FORMING APPARATUS

This application is a Divisional of Copending U.S. patent application Ser. No. 11/582,503 filed Oct. 18, 2006 and claims priority to Japanese Patent Application Nos. 2005-363091 and 2006-208413, filed Dec. 16, 2005 and Jul. 31, 2006, respectively, all of which are hereby incorporated by reference in their entirety.

BACKGROUND OF THE INVENTION

Technical Field

The present invention relates to an image forming apparatus such as an electrophotographic copying machine, printer, fax machine, or multifunction machine provided with the combination of these functions, and more specifically, to an image forming apparatus capable of reducing disagreeable odor and VOC exhausted out of the apparatus from an ejection portion for ejecting recording media such as sheets of paper.

SUMMARY

According to an aspect of the invention, an image forming apparatus includes a recording-medium stacking portion, a recording-medium ejection portion and a suctioning/exhausting unit. The recording-medium stacking portion is provided in a body portion or an upper portion of the image forming apparatus. The recording-medium stacking portion stacks recording media on which respective images are formed thereon. The recording-medium ejection portion ejects the recording medium in a recording-medium ejection direction to the recording-medium staking portion. The suctioning/exhausting unit is located with respect to the recording-medium stacking portion in a direction, which is perpendicular to the recording-medium ejection direction and parallel to a surface of the recording medium staked on the recording-medium stacking portion. The suctioning/exhausting unit suctions air emitted from the recording medium, which is ejected from the recording-medium ejection portion onto the recording-medium stacking portion. The suctioning/exhausting unit exhausts the suctioned air through a filter.

BRIEF DESCRIPTION OF THE DRAWINGS

Embodiments of the present invention will be described in detail based on the following figures, wherein.

DETAILED DESCRIPTION

Exemplary embodiments of the invention will be described below with reference to the drawings.

First Exemplary Embodiment

Figure 2:
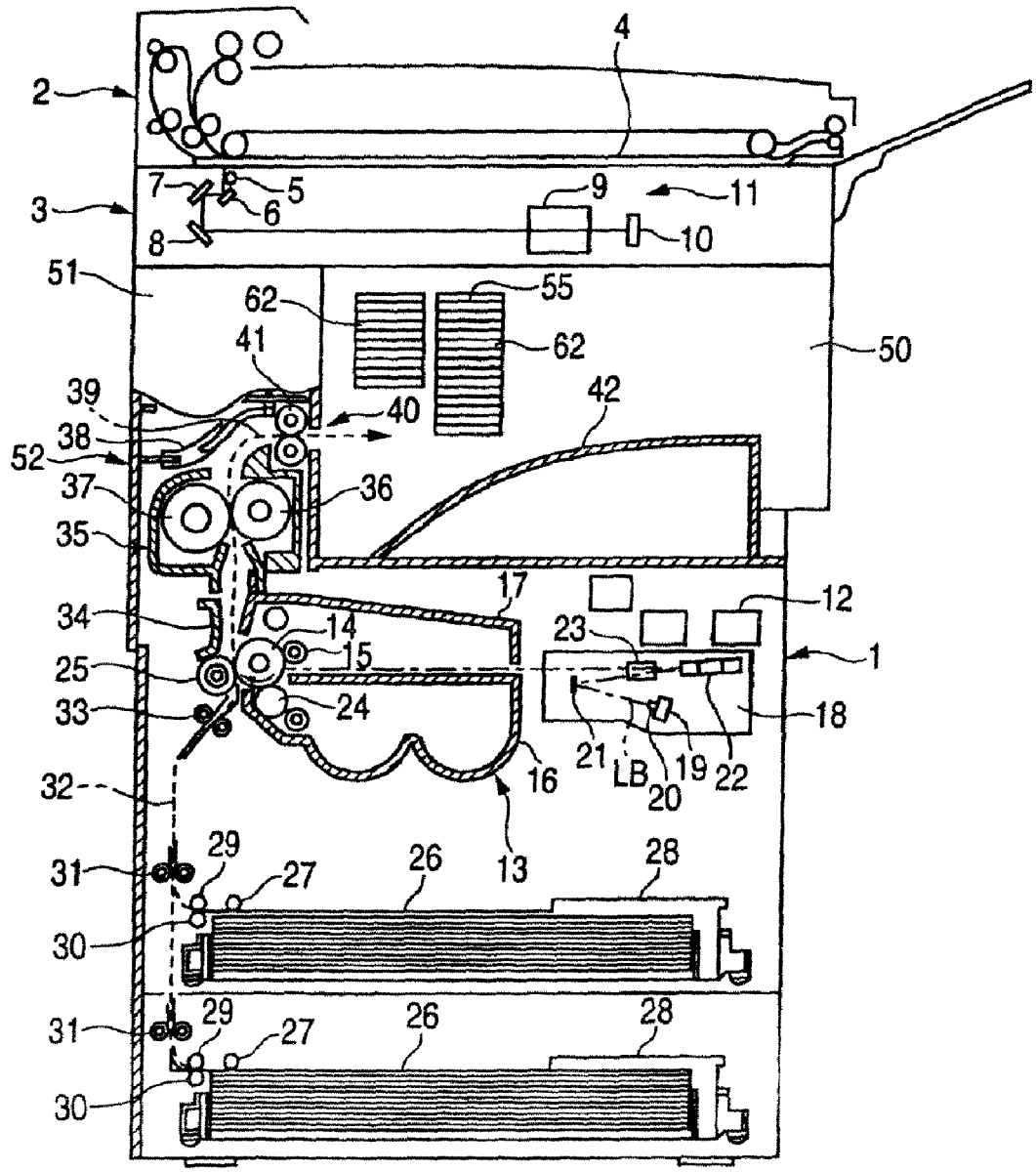
FIG. 2 is a block diagram illustrating the black and white multifunction machine as the image forming apparatus according to the first exemplary embodiment of the invention.

FIG. 2 is a block diagram showing a black and white multifunction machine as an image forming apparatus according to a first exemplary embodiment of the invention. This black and white multifunction machine is provided with the combination of the functions of a copying machine, printer, and fax machine.

As shown in FIG. 2, this black and white multifunction machine includes in its upper portion a scanner unit 3 as an image reading device and is connected to a personal computer or the like (not shown) over a network (not shown).

The above black and white multifunction machine is adapted to reproduce an image of a document read by the scanner unit 3, print an image based on image data sent from the personal computer or the like, and function as a fax machine sending and receiving image data over a telephone line.

Figure 3:
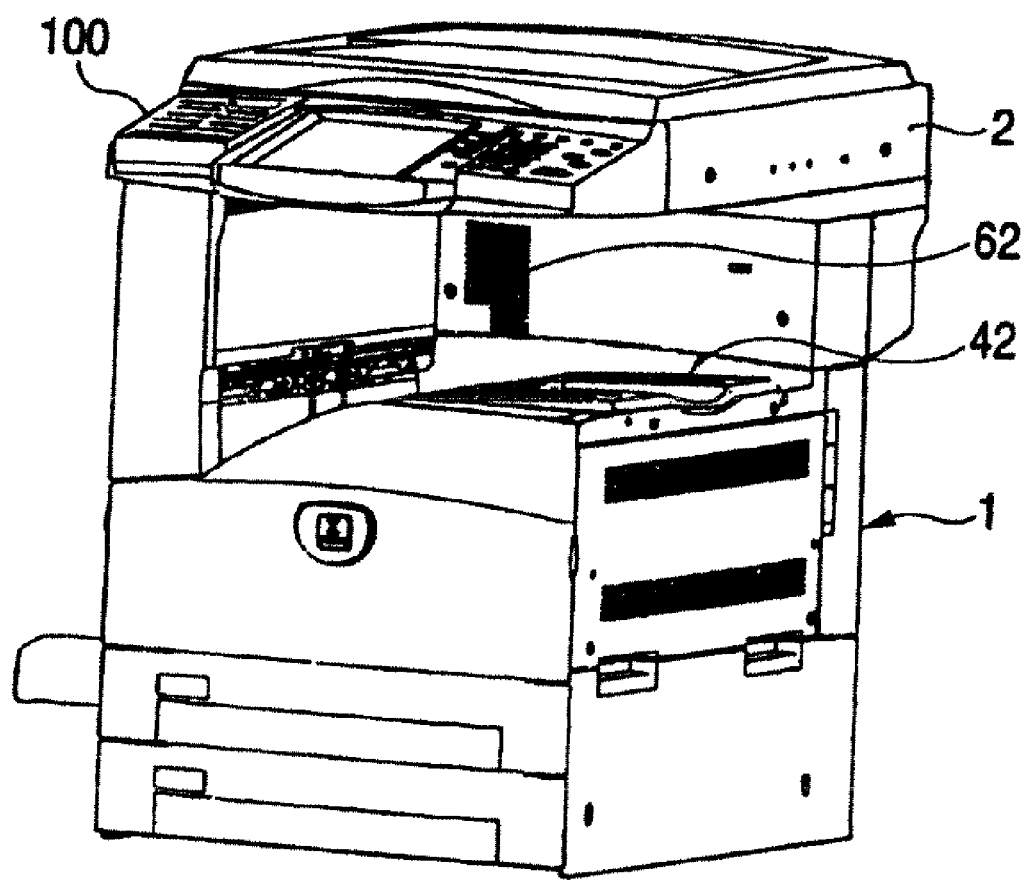
FIG. 3 is a perspective external view illustrating the black and white multifunction machine as the image forming apparatus according to the first exemplary embodiment of the invention.

As shown in FIG. 3, the black and white multifunction machine includes an operation panel 100 that allows a user to input an instruction to the black and white multifunction machine.

In FIG. 2, reference number 1 denotes the body of the black and white multifunction machine. In the upper portion of the body of the black and white multifunction machine 1 are disposed an automatic document feeder (ADF) 2 for automatically transporting documents (not shown) separately on a one-by-one basis and the scanner unit 3 for reading an image of a document transported by the automatic document feeder 2. The scanner unit 3 is configured to illuminate the document placed on a platen glass 4 with a light source 5, project the reflected light image from the document in a scanning manner through a reduction optical system 11 including a full rate mirror 6, half rate mirrors 7, 8, and an imaging lens 9 onto an image reading element 10 such as a CCD, and read the reflected light color image of the document with the image reading element 10 at a predetermined dot density (16 dot/mm, for example).

The reflected light image of the document read by the scanner unit 3 is sent to an image processing system (IPS) 12, for example, in the form of 3-color reflectance data of red (R), green (G), and blue (B), each having 8-bit resolution. The image processing system 12 provides, as required, predetermined image processing on the image data of the document, including shading correction, misalignment correction, brightness/color space conversion, gamma correction, frame deletion, and color/motion editing, which will be described later. The image processing system 12 also provides the predetermined image processing on image data sent from the personal computer or the like (not shown).

Inside the body of the black and white multifunction machine 1 is disposed a process cartridge 13 that integrally unitizes image forming members such as a photosensitive drum and works as a main part of an image forming unit for electrophotographically forming an image on a sheet of paper. The process cartridge 13 is removably attached to the body of the black and white multifunction machine 1 such that it can be replaced with a new cartridge 13 by opening a cover (not shown) provided, for example, on the upper portion of the body of the black and white multifunction machine 1 when the photosensitive drum provided in the process cartridge 13 has reached the end of its life or the toner in a developing unit has been consumed.

As shown in FIG. 2, the process cartridge 13 is configured to have a photosensitive drum 14 as an image carrier, a charging roll 15 as charging means, a developing unit 16 as developing means, and a cleaning unit 17.

The photosensitive drum 14 employs, for example, a conductive cylinder coated with an organic photoconductor (OPC) and adapted to be driven by driving means (not shown) at a predetermined rotational speed along the direction indicated by the arrow. The surface of the photosensitive drum 14 is uniformly charged to a predetermined electrical potential by the charging roll 15 as charging means, and then exposed with an image by a laser writing unit 18 as exposing means to form an electrostatic latent image according to the image information. The laser writing unit 18 is configured to modulate a semiconductor laser 19 based on the image data having undergone the predetermined image processing in the image processing system 12, and project a laser beam LB emitted from the semiconductor laser 19 on the photosensitive drum 14 in a scanning manner through an imaging optical system including a collimator lens 20, a reflective mirror 21, a polygonal mirror 22, an f-θ lens 23 and the like to form the electrostatic latent image on the surface of the photosensitive drum 14. The electrostatic latent image formed on the photosensitive drum 14 is developed by a developing roll 24 in the developing unit 16 containing a mono-component developer (toner) to form a toner image. Of course, the developing unit 16 may use a two-component developer.

As shown in FIG. 2, the toner image formed on the photosensitive drum 14 is transferred onto a recording sheet 26 as a recording medium by a transfer roll 25 as transferring means. The recording sheet 26 is fed by a feed roll 27 from one of trays 28 of a plurality of feed cassettes, and transported separately on a one-by-one basis by a separation roll 29 and retard roll 30 along a sheet transport path 32 through transport rolls 31 to resist rolls 33, and temporarily stays there. The recording sheet 26 is then transported to the surface of the photosensitive drum 14 by the resist roll 33 in synchronization with the toner image formed on the photosensitive drum 14, and the toner image is transferred by the transfer roll 25 from the photosensitive drum 14 onto the recording sheet 26.

In the lower portion of the body of the exemplary black and white multifunction machine 1 shown in FIG. 2 are disposed two sets of feed cassette trays 28.

The recording sheet 26 on which the toner image was transferred proceeds away from the photosensitive drum 14 to a fixing unit 35 through a transport guide 34. The recording sheet 26 then undergoes a fixing process in which heat and pressure are applied by a heat roll 36 and a pressure roll 37 in the fixing unit 35. Subsequently, the recording sheet 26 is guided along a sheet transport path 39 formed of the transport guide 34 and a transport shoot 38, redirected about 90 degrees, and ejected by sheet ejection rolls 41 disposed close to a sheet ejection portion 40 on a sheet ejection tray 42 as a recording-medium stacking portion outside the machine, which then completes a sequence of the image forming process.

In the above black and white multifunction machine, the scanner unit 3 is provided in the upper portion of the body of the black and white multifunction machine 1, and the sheet ejection tray 42 as a recording-medium stacking portion is provided inside a body portion of the black and white multifunction machine formed of the body of the black and white multifunction machine 1 and the scanner unit 3.

After the toner image transfer process completes, the cleaning unit 17 removes residual toner or the like from the surface of the photosensitive drum 14 to make the surface ready for the next image forming process.

In the image forming apparatus according to this exemplary embodiment, an image forming apparatus includes a recording-medium stacking portion, a recording-medium ejection portion and a suctioning/exhausting unit. The recording-medium stacking portion is provided in a body portion or an upper portion of the image forming apparatus. The recording-medium stacking portion stacks recording media on which respective images are formed thereon. The recording-medium ejection portion ejects the recording medium in a recording-medium ejection direction to the recording-medium stacking portion. The suctioning/exhausting unit is located with respect to the recording-medium stacking portion in a direction, which is perpendicular to the recording-medium ejection direction and parallel to a surface of the recording medium stacked on the recording-medium stacking portion. The suctioning/exhausting unit suctions air emitted from the recording medium, which is ejected from the recording-medium ejection portion onto the recording-medium stacking portion. The suctioning/exhausting unit exhausts the suctioned air through a filter.

Figure 1:
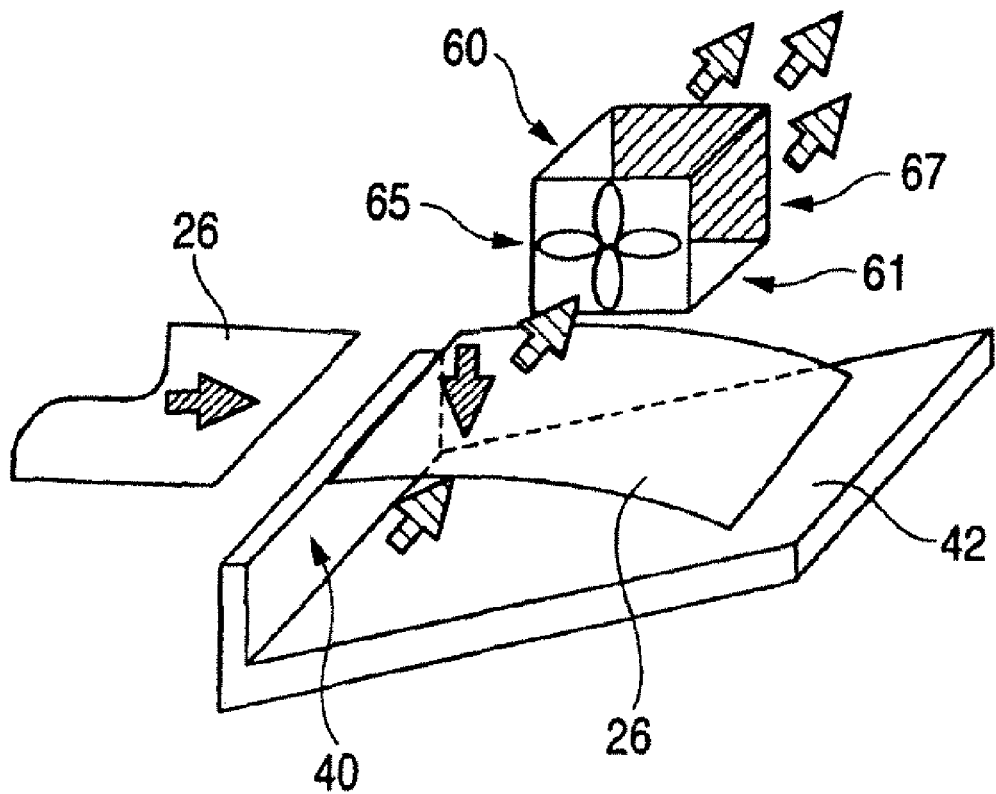
FIG. 1 is a schematic block diagram illustrating the main part of a black and white multifunction machine as an image forming apparatus according to a first exemplary embodiment of the invention.

That is, as shown in FIGS. 1 to 3, the above black and white multifunction machine is provided with a suctioning/exhausting unit 60 on the rear side of the sheet ejection tray 42, which serves as a recording-medium stacking portion, that is, in a direction perpendicular to the sheet ejection direction and parallel to the surface of the sheet of paper. The suctioning/exhausting unit 60 suctions the air discharged from both the sheet ejection portion 40 and the sheet ejection tray 42 and exhausts the suctioned air through the filter. The suctioning/exhausting unit 60 is disposed, for example, in a region of the sheet ejection tray 42, which is the vicinity of and above the sheet ejection portion 40 including the sheet ejection rolls 41. Of course, the suctioning/exhausting unit 60 may not be disposed in the region of the sheet ejection tray 42, which is the vicinity of and above the sheet ejection portion 40, but may be disposed in a region in the vicinity of and rearward of the sheet ejection portion 40.

As shown in FIGS. 2 and 3, the black and white multifunction machine is provided with a box-like support portion 50 on the rear side of the sheet ejection tray 42 functioning as a recording-medium stacking portion in the direction perpendicular to the sheet ejection direction. The box-like support portion 50 supports the scanner unit 3 and connects the scanner unit 3 and the body of the black and white multifunction machine 1. The support portion 50 is a generally L-shaped member extending across the rear side and left side of the scanner unit 3. A portion 51 of the support portion 50 located on the left side of the scanner unit 3 is integrally formed with a sheet ejection unit 52 of the body of the black and white multifunction machine 1. The support portion 50 houses members for providing image processing functions, including the predetermined image processing, image editing and image data accumulation for images read by the scanner unit 3 or image data sent from the personal computer or the like (not shown).

As shown in FIGS. 2 and 3, the suctioning/exhausting unit 60 includes an inlet 62 with louvers 55 provided on the front side of the support portion 50. As shown in FIG. 1, the inlet 62 communicates with a short, generally rectangular duct 61 protruding toward the rear side of the support portion 50. The duct 61 defines a compartment separate from the interior of the support portion 50 and is configured to exhaust the air suctioned from the inlet 62 out of the image forming apparatus through an outlet provided on the opposite side of the duct 61. The duct 61 does not communicate with the inside of the black and white multifunction machine 11. The duct 61 suctions external air only through the inlet 62 and exhausts the suctioned air from an outlet disposed on an opposite side to the duct 61.

In consideration of the apparatus configuration, the suctioning/exhausting unit 60 including the duct 61 and the like is disposed in the support portion 50 that connects the scanner unit 3 and the body of the black and white multifunction machine 1. Alternatively, the suctioning/exhausting unit 60 may of course be configured separately independent of the support portion 50 or the like.

Figure 4:
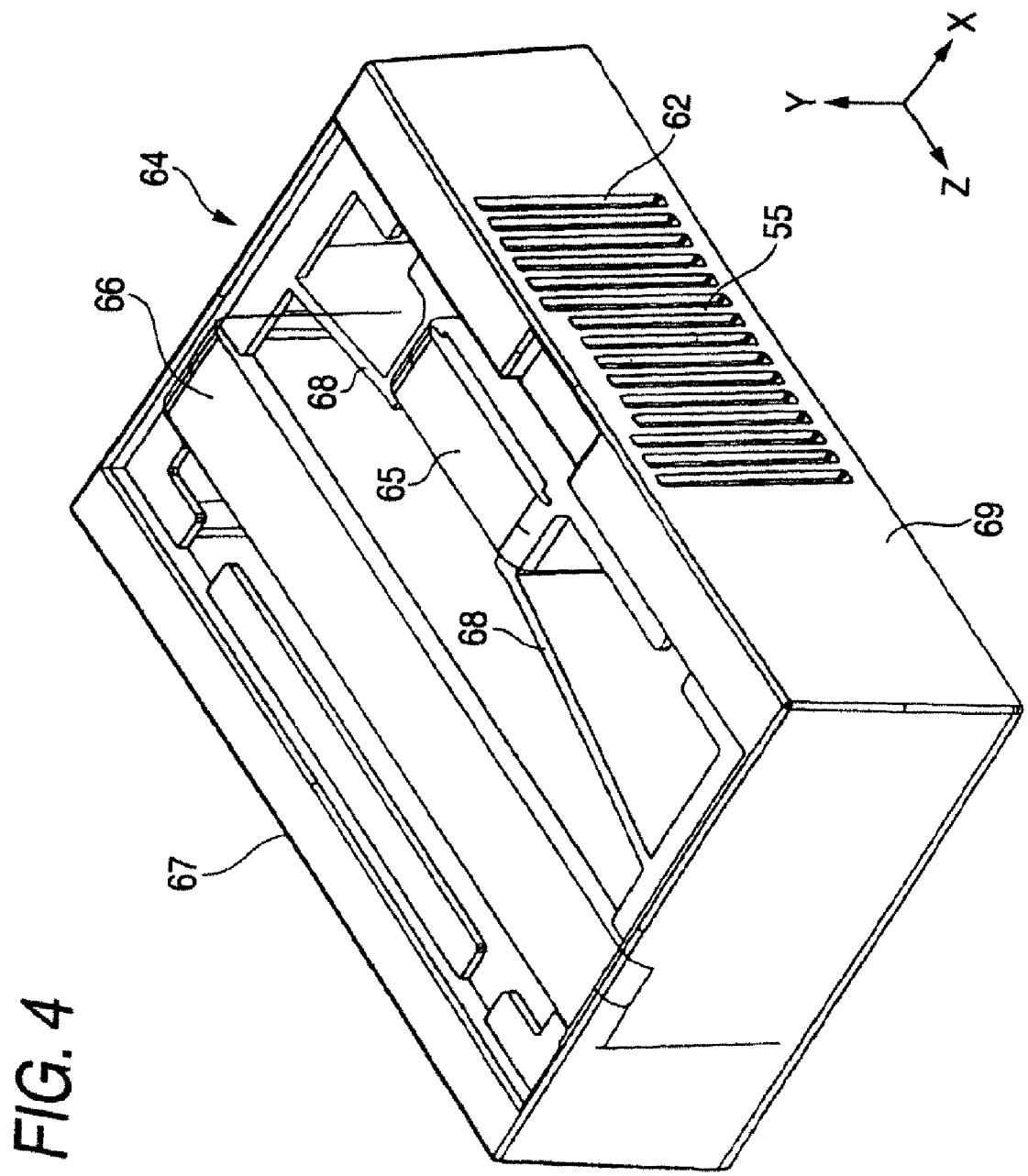
FIG. 4 is a schematic configuration view illustrating a suctioning/exhausting unit.
Figure 5:
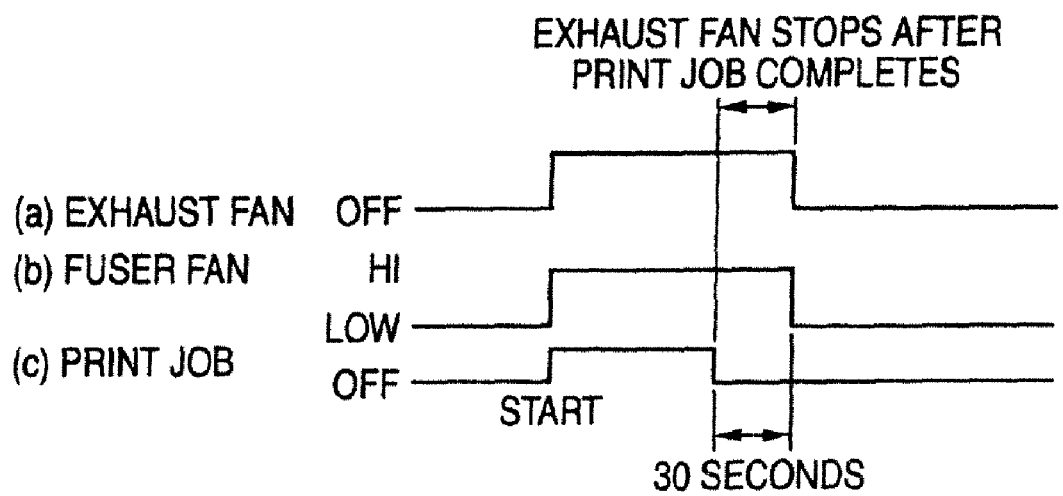
FIG. 5 is a timing chart illustrating a drive timing of an exhaust fan.

As shown in FIGS. 1 and 4, the duct 61 houses an exhaust fan 65 and a filter 66 and has a rear surface 67 that is fully open to outside. The interior of the exhausting portion 64 includes partition walls 68 to provide a narrow space on the upstream side of the exhaust fan 65 so that the exhaust fan 65 collets the air passing through the inlet 62, and the air exhausted by the exhaust fan 65 slightly spreads out and is exhausted outside from louvers 55 provided on the rear surface 67 of the exhausting portion 64.

The filter 66 is formed of at least two of the following filters: a filter for removing odor, a filter for adsorbing or decomposing volatile organic compounds, and a filter for adsorbing or decomposing ozone. In this exemplary embodiment, the filter 66 is formed of the filter for removing odor and the filter for adsorbing or decomposing volatile organic compounds.

As will be described below, the black and white multifunction machine configured as above according to this exemplary embodiment can effectively remove disagreeable odor, volatile organic compounds and the like discharged from the region in the vicinity of the ejection portion of the apparatus in the direction perpendicular to the sheet ejection direction without extra cost, increased noise, greater power consumption, bulkier apparatus or the like.

That is, as shown in FIG. 2, in the black and white multifunction machine according to this exemplary embodiment, the image of the document read by the scanner unit 3 undergoes the predetermined image processing provided by the image processing unit 12 and is used to form the toner image on the photosensitive drum 14 in the process cartridge 13 that forms the main part of the image forming unit, and then the toner image formed on the photosensitive drum 14 is transferred onto the recording sheet 26 by the transfer roll 25.

Then, the toner image transferred as a whole image onto the recording sheet 26 is fixed on the sheet 26 by heat and pressure of the fixing unit 35. The thus processed recording sheet 26 is ejected by sheet ejection rolls 41 from the sheet ejection portion 40 onto the sheet ejection tray 42 provided in the upper portion of the body of the black and white multifunction machine 1, which then completes the image forming process.

When the toner image is fixed onto the recording sheet 26 by heat and pressure of the fixing unit 35, disagreeable odor and volatile organic compounds (VCO) are produced from the toner and the like. As shown in FIG. 1, the odor and volatile organic compounds (VCO) produced from the toner and the like is discharged out of the body of the black and white multifunction machine 1 along with the recording sheet 26 when the recording sheet 26 is ejected from the sheet ejection portion 40 onto the sheet ejection tray 42 provided in the upper portion of the body of the black and white multifunction machine 1.

As shown in FIG. 1, the recording sheet 26 is ejected from the sheet ejection portion 40 located above the inclined sheet ejection tray 42 toward the sheet ejection tray 42 and drops due to its own weight into the sheet ejection tray 42. There is a layer of air between the sheet ejection tray 42 and the recording sheet 26 ejected from the sheet ejection portion 40 onto the sheet ejection tray 42. As shown in FIG. 1, the air above the sheet ejection tray 42 is moved in the direction, which is perpendicular to the sheet ejection direction and parallel to the surface of the sheet of paper, when the recording sheet 26 drops due to its own weight on the sheet ejection tray 42.

In this exemplary embodiment, as shown in FIG. 1, the suctioning/exhausting unit 60 provided with the inlet 62 is disposed on the rear side of the sheet ejection tray 42, that is, in the direction, which is perpendicular to the sheet ejection direction and parallel to the surface of the sheet of paper, and the exhaust fan 65 provided in the suctioning/exhausting unit 60 is driven.

Figure 7:
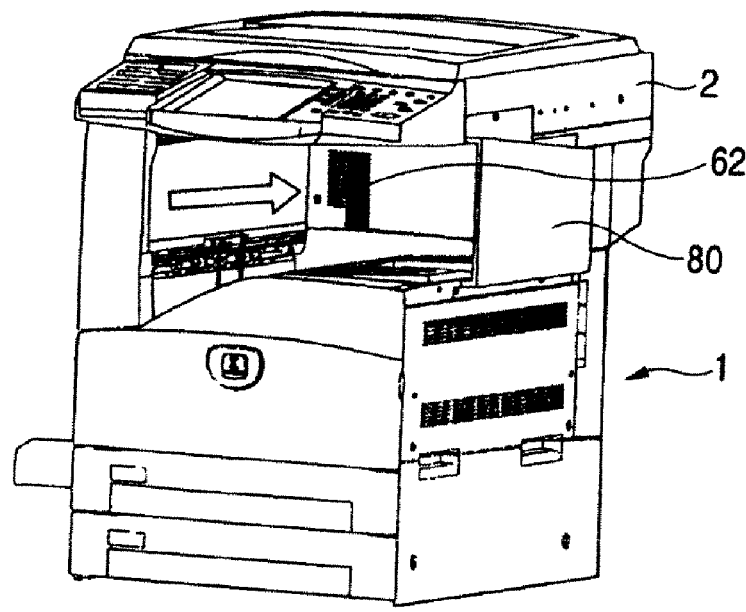
FIG. 7 is a perspective external view illustrating a black and white multifunction machine as the image forming apparatus according to a second exemplary embodiment of the invention.

In this exemplary embodiment, as shown in FIG. 7, the exhaust fan 65 is driven in synchronization with the start of the image forming operation, that is, in the example shown in the figure, in synchronization with the high state of a fuser fan in the fixing unit. The exhaust fan 65 is also configured such that it continues to operate for a predetermined time period (about 30 seconds, for example) after the image forming operation has completed.

Figure 6:
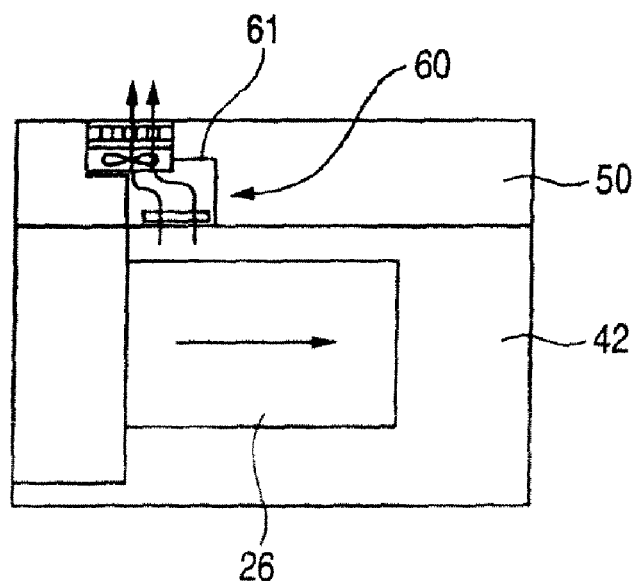
FIG. 6 is a schematic plan diagram illustrating the main part of the black and white multifunction machine as the image forming apparatus according to the first exemplary embodiment of the invention.

The disagreeable odor and volatile organic compounds produced when the unfixed toner image is fixed on the recording sheet 26 in the fixing unit 35 are discharged from the sheet ejection portion 40 out of the body of the black and white multifunction machine 1 as the recording sheet 26 moves. However, according to the above configuration, as shown in FIGS. 1 and 6, the odor and volatile organic compounds discharged from the sheet ejection portion 40 and sheet ejection tray 42 out of the body of the black and white multifunction machine 1 are immediately suctioned through the inlet 62 of the suctioning duct 61 disposed on the rear side of the sheet ejection tray 42, that is, in the direction, which is perpendicular to the sheet ejection direction and parallel to the surface of the sheet of paper. The suctioned air is then filtered out through the filter 66 provided in the suctioning duct 61, and discharged through the exhaust fan 65 out of (to the rear side of) the body of the black and white multifunction machine 1.

Thus, in the black and white multifunction machine according to this exemplary embodiment, the suctioning/exhausting unit 60 is disposed on the rear side of the sheet ejection tray 42, that is, in the direction, which is perpendicular to the sheet ejection direction and parallel to the surface of the sheet of paper. The exhaust fan 65 provided in the suctioning duct 61 of the suctioning/exhausting unit 60 is driven to efficiently suction the disagreeable odor and volatile organic compounds from the inlet 62 of the suctioning duct 61. The suctioned disagreeable odor and volatile organic compounds are filtered out through the filter 66, and then discharged through the exhaust fan 65 out of the body of the black and white multifunction machine 1. Therefore, the above black and white multifunction machine can efficiently suction and remove the disagreeable odor and volatile organic compounds emitted from the recording sheet 26 and the like and discharge them out of the machine by providing the suctioning/exhausting unit 60 on the rear side of the sheet ejection tray 42 of the body of the black and white multifunction machine 1, that is, in the direction, which is perpendicular to the sheet ejection direction and parallel to the surface of the sheet of paper.

Accordingly, it is possible to effectively remove the disagreeable odor, volatile organic compounds and the like discharged from the region in the vicinity of the ejection portion of the image forming apparatus in the direction, which is perpendicular to the sheet ejection direction and parallel to the surface of the sheet of paper, without the exhaust fan 65 being made larger or its rotational speed being increased, that is, without increase in cost, noise, power consumption, or size of the apparatus as is the case with the black and white multifunction machine in which the suctioning/exhausting unit 60 located away from the sheet ejection tray 42 of the body of the black and white multifunction machine 1 suctions the odor and volatile organic compounds emitted from the recording sheet 26 and the like.

Second Exemplary Embodiment

FIG. 7 shows a second exemplary embodiment of the invention. In the following description, the same parts as those of the first exemplary embodiment have the same characters. The second exemplary embodiment is configured such that the recording-medium stacking portion includes a cover member that closes at least one of surfaces of the image forming apparatus except a side of an operation unit.

Specifically, as shown in FIG. 7, the black and white multifunction machine according to the second exemplary embodiment is configured such that a cover member 80 closes the downstream side of the sheet ejection tray 42 in the sheet ejection direction. Thus, the support portion, sheet ejection portion, and the cover member 80 covers the rear, left and right sides of the upper portion of the sheet ejection tray 42 to form a barrel-like space, resulting in covering all surfaces of the sheet ejection tray 42 except the surface of the operation unit (the front side) of the black and white multifunction machine.

The cover member 80 is desirably formed of a transparent plastic plate, making the recording sheet 26 ejected on the sheet ejection tray 42 visible from outside of the image forming apparatus.

By providing the cover member 80 that closes the downstream side of the sheet ejection tray 42 in the sheet ejection direction, the cover member 80 prevents disagreeable odor, volatile organic compounds and the like from being discharged outside from the downstream side of the sheet ejection tray 42 in the sheet ejection direction. Therefore, the odor, volatile organic compounds and the like above the sheet ejection tray 42 can be suctioned and removed by the suctioning/exhausting unit 60.

Since other arrangements and effects of this exemplary embodiment are similar to those of the above exemplary embodiment, the description thereof will be omitted.

Third Exemplary Embodiment

Figure 8:
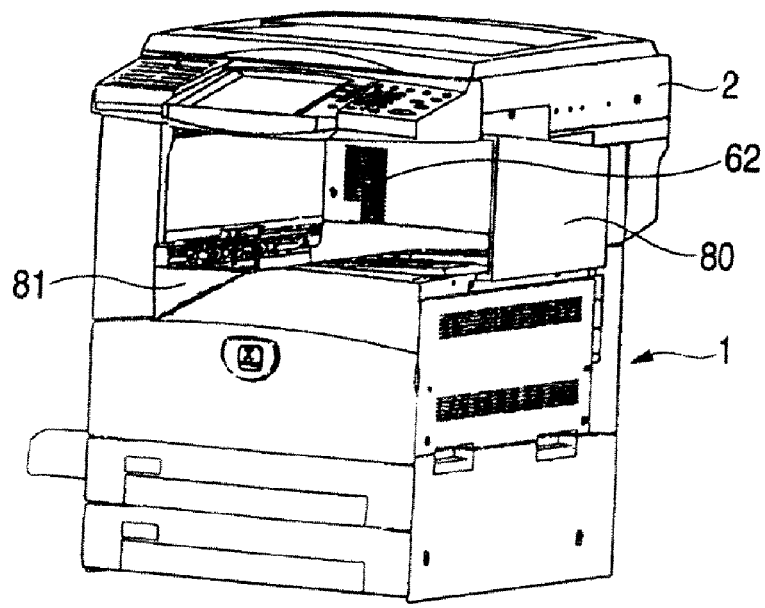
FIG. 8 is a perspective external view illustrating a black and white multifunction machine as the image forming apparatus according to a third exemplary embodiment of the invention.

FIG. 8 shows a third exemplary embodiment of the invention. In the following description, the same parts as those of the first exemplary embodiment have the same characters. The third exemplary embodiment is configured such that the suctioning/exhausting unit is located on one side of the recording-medium stacking portion in the direction, which is perpendicular to the ejection direction and parallel to the surface of the recording medium, and that the image forming apparatus further includes a cover member disposed on an opposite side to the suctioning/exhausting unit to block the air from being discharged.

Specifically, as shown in FIG. 8, in the black and white multifunction machine according to the third exemplary embodiment, the suctioning/exhausting unit 60 is provided only on one side of the sheet ejection tray 42 in the direction, which is perpendicular to the sheet ejection direction and parallel to the surface of the recording medium, that is, on the rear side of the sheet ejection tray 42. A blocking member 81 formed of a triangular plate is provided on the opposite side to the suctioning/exhausting unit 60 (the front side) to block the air from being discharged.

The blocking member 81 formed of the triangular plate is thus provided on the opposite side from the suctioning/exhausting unit 60 (the front side) to block the air from being discharged. Therefore, when the sheet 26 drops on the sheet ejection tray 42, disagreeable odor and volatile organic compounds emitted from the recording sheet 26 can be prevented from leaking to the front side. The odor and volatile organic compounds blocked by the blocking member 81 return to the rear side and are suctioned and removed by the suctioning/exhausting unit 60.

Since other arrangements and effects of this exemplary embodiment are similar to those of the above embodiments, the description thereof will be omitted.

Fourth Exemplary Embodiment

Figure 9:
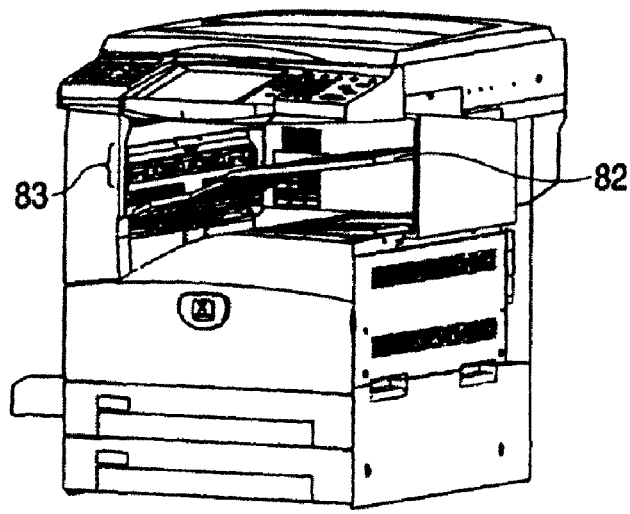
FIG. 9 is a perspective external view illustrating a black and white multifunction machine as an image forming apparatus according to a fourth exemplary embodiment of the invention.

FIG. 9 shows a fourth exemplary embodiment of the invention. In the following description, the same parts as those of the first exemplary embodiment have the same characters. The fourth exemplary embodiment is configured such that an additional stacking portion on which recording media are ejected can be added to in an upper portion of the recording-medium stacking portion, and that the suctioning/exhausting unit suctions and exhausts air emitted from both the recording-medium stacking portion and the additional stacking portion.

Specifically, as shown in FIG. 9, in the black and white multifunction machine according to the fourth exemplary embodiment, a bin tray 82 functioning as the additional stacking portion is added to the sheet ejection tray 42 functioning as the recording-medium stacking portion, and a second sheet ejection portion 83 for ejecting sheets of paper is added above the sheet ejection portion 40. This configuration enables printed recording sheets 26 to be ejected onto the sheet ejection tray 42; copied recording sheets 26 to be ejected onto the bin tray 82; copied recording sheets 26 to be sorted and ejected accordingly onto the sheet ejection tray 42 and bin tray 82; or printed or copied recording sheets 26 to be ejected on the sheet ejection tray 42 and faxed sheets to be ejected onto the bin tray 82.

As shown in FIG. 9, the above black and white multifunction machine is configured such that the air is suctioned from both the sheet ejection tray 42 and bin tray 82 into the inlet 62 of the suctioning/exhausting unit 60 and exhausted therethrough.

Since other arrangements and effects of this exemplary embodiment are similar to those of the above embodiments, the description thereof will be omitted.

Fifth Exemplary Embodiment

Figure 10:
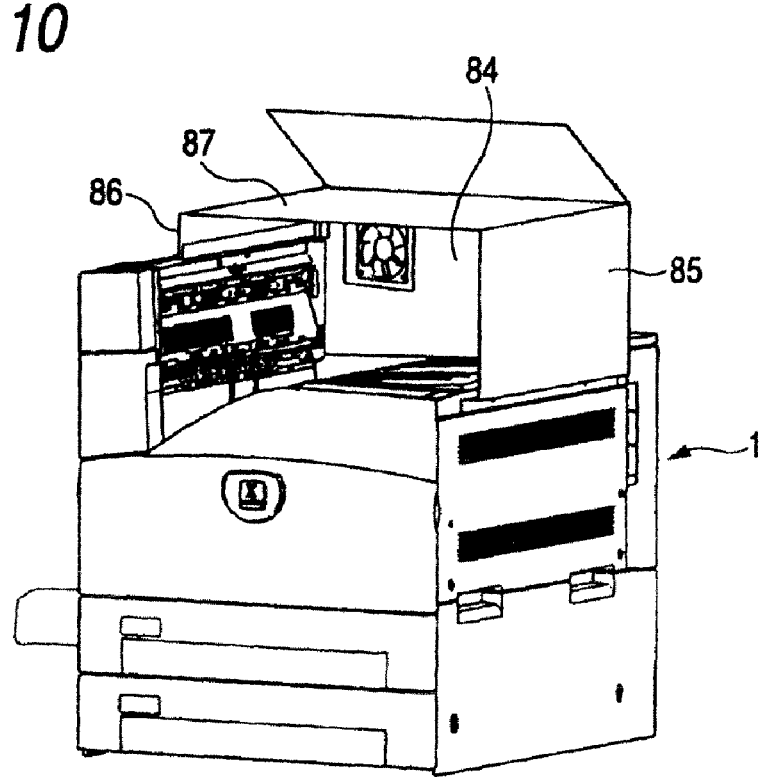
FIG. 10 is a perspective external view illustrating a black and white multifunction machine as an image forming apparatus according to a fifth exemplary embodiment of the invention.

FIG. 10 shows a fifth exemplary embodiment of the invention. In the following description, the same parts as those of the first exemplary embodiment have the same characters. The fifth exemplary embodiment is configured such that the recording-medium stacking portion is located in the upper portion of the image forming apparatus, and that the image forming apparatus further includes a cover member that closes at least one surface of the recording-medium stacking portion.

Figure 11:
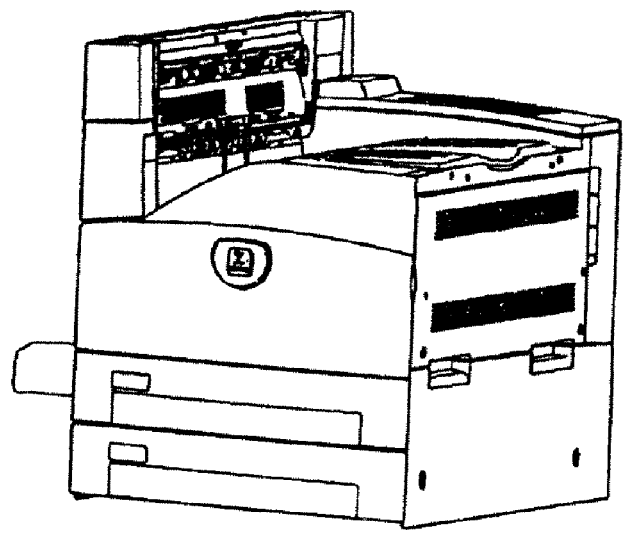
FIG. 11 is a perspective external view illustrating an example of a black and white multifunction machine as an image forming apparatus.

Specifically, as shown in FIGS. 10 and 11, the black and white multifunction machine according to the fifth exemplary embodiment is not provided with the scanner unit 3 in the upper portion of the body of the black and white multifunction machine 1, but the sheet ejection tray 42 functioning as the recording-medium stacking portion in the upper portion of (the body of) the black and white multifunction machine.

In the fifth exemplary embodiment, cover members 84, 85, 86, and 87 are provided to close the rear side, upper right side, upper left side, and top side of the sheet ejection tray 42, respectively. The top side cover member 87 is openable.

Also in a printer without the scanner unit 3, these covers can prevent disagreeable odor and volatile organic compounds emitted from the recording sheet 26 around the sheet ejection tray 42, from leaking to the front side.

Since other arrangements and effects of this exemplary embodiment are similar to those of the above embodiments, the description thereof will be omitted.

Sixth Exemplary Embodiment

Figure 12:
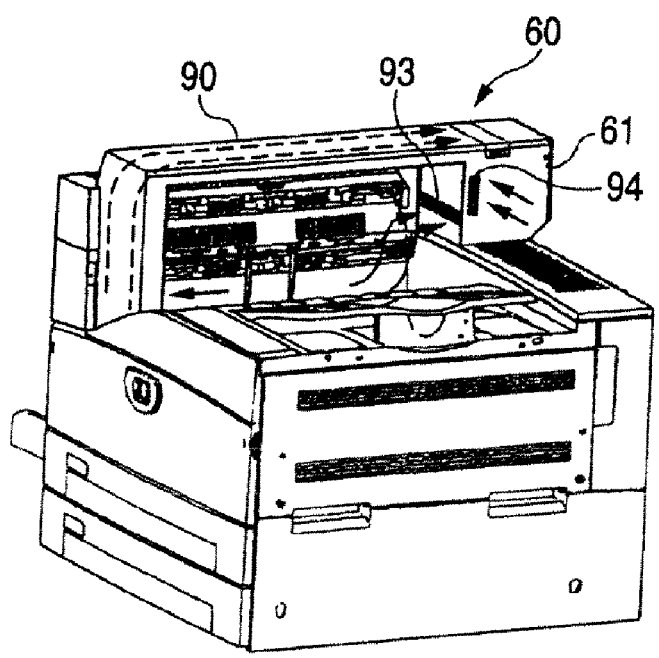
FIG. 12 is a perspective external view illustrating a black and white multifunction machine as an image forming apparatus according to a sixth exemplary embodiment of the invention.

FIG. 12 shows a sixth exemplary embodiment of the invention. In the following description, the same parts as those of the first exemplary embodiment have the same characters. In the apparatus according to the sixth exemplary embodiment, the recording-medium stacking portion is located in the upper portion of the image forming apparatus. The suctioning/exhausting unit suctions air from both the ejection direction and the direction, which is perpendicular to the ejection direction and parallel to the surface of the recording medium.

Figure 13:
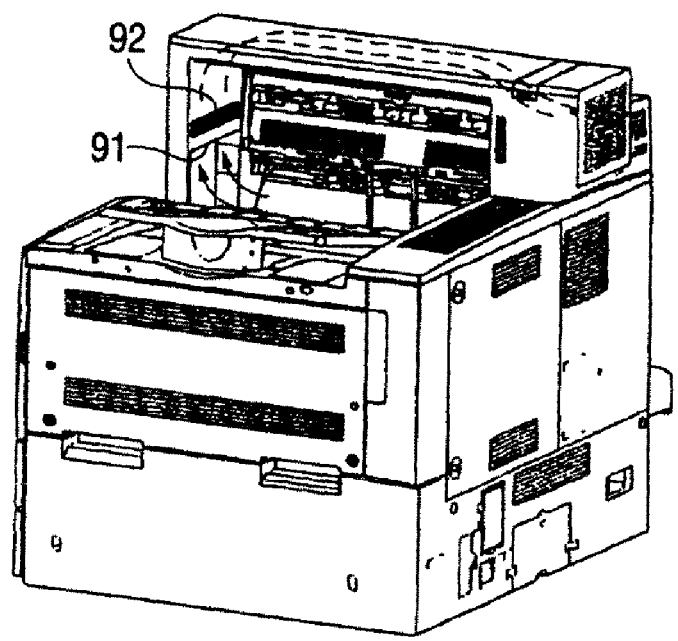
FIG. 13 is a perspective external view illustrating the black and white multifunction machine as an image forming apparatus according to the sixth exemplary embodiment of the invention.

In the sixth exemplary embodiment, the image forming apparatus includes a duct member that extends through front, rear and top sides of the recording-medium stacking portion to surround a region in a vicinity of the recording-medium ejection portion Specifically, as shown in FIGS. 12 and 13, the black and white multifunction machine according to the sixth exemplary embodiment is not provided with the scanner unit 3 in the upper portion of the body of the black and white multifunction machine 1, but the sheet ejection tray 42 functioning as the recording-medium stacking portion in the upper portion of (the body of) the black and white multifunction machine as with the fifth exemplary embodiment.

In the sixth exemplary embodiment, the suctioning/exhausting unit 60 is provided to suction from both sides of the sheet ejection tray 42 in the direction, which is perpendicular to the sheet ejection direction and parallel to the surface of the sheet of paper. A gate-shaped duct member 90 is disposed at a base end portion of the sheet ejection tray 42 to surround the front and rear sides of the base end portion of the sheet ejection tray 42 in the direction, which is perpendicular to the sheet ejection direction and parallel to the surface of the sheet of paper, as well as the top side of the base end portion of the sheet ejection tray 42. The duct member 90 does not communicate with the inside of the black and white multifunction machine 1. The duct member 90 suctions external air only through an inlet 92 and exhausts the suctioned air from an outlet disposed on an opposite side to the inlet 92.

Figure 14:
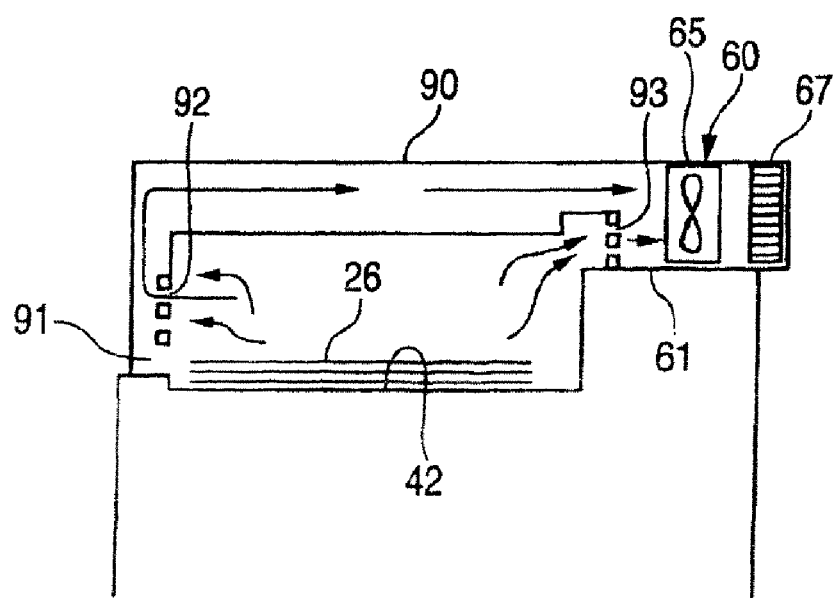
FIG. 14 is a schematic section view illustrating the black and white multifunction machine as an image forming apparatus according to the sixth exemplary embodiment of the invention.

As shown in FIG. 14, the duct member 90 has inlets 91 and 92 on the front side of the sheet ejection tray 42 in the direction, which is perpendicular to the sheet ejection direction and parallel to the surface of the sheet of paper, and at the positions corresponding to the upper portion of the first sheet ejection portion 40 and to a side portion or downward portion of the second sheet ejection portion 83 respectively. The duct member 90 also has an inlet 93 on the rear side of the sheet ejection tray 42 in the direction perpendicular to the sheet ejection direction and at the position corresponding to a side portion or downward portion of the second sheet ejection portion 83.

This allows the inlets 91, 92 and 93 of the duct member 90 to effectively suction disagreeable odor and volatile organic compounds emitted from the recording sheet 26 onto the sheet ejection tray 42.

Since other arrangements and effects of this exemplary embodiment are similar to those of the above embodiments, the description thereof will be omitted.

Seventh Exemplary Embodiment

Figure 15:
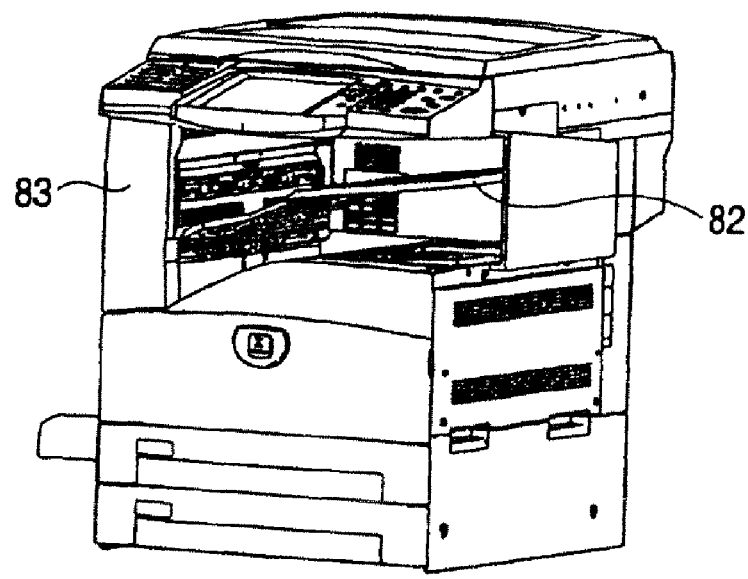
FIG. 15 is a perspective external view illustrating a black and white multifunction machine as the image forming apparatus according to the seventh exemplary embodiment of the invention.

FIG. 15 shows a seventh exemplary embodiment of the invention. In the following description, the same parts as those of the first exemplary embodiment have the same characters. In the seventh exemplary embodiment, the second sheet ejection portion can eject recording sheets upside down by counterrotating the sheet ejection rolls therein.

Figure 16:
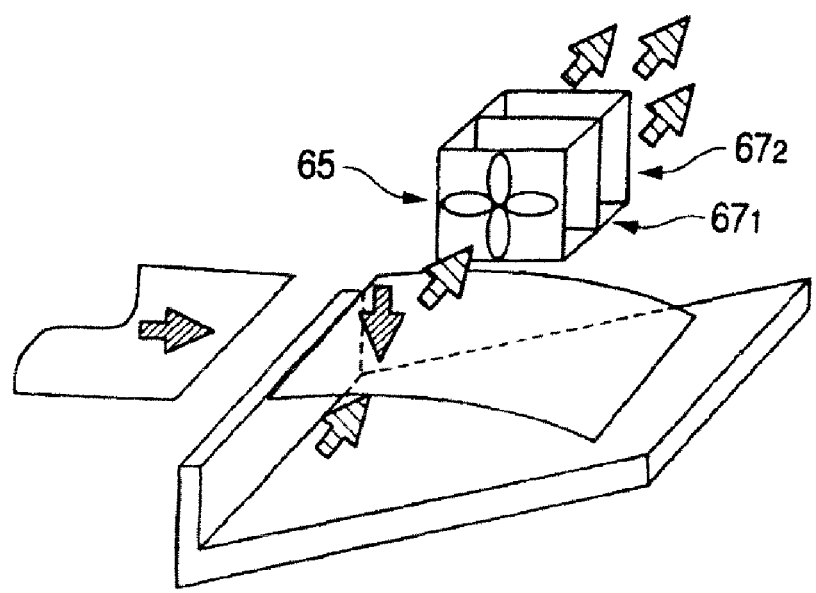
FIG. 16 is a schematic block configuration view illustrating the main part of the black and white multifunction machine as the image forming apparatus according to the seventh exemplary embodiment of the invention.
Figure 17:
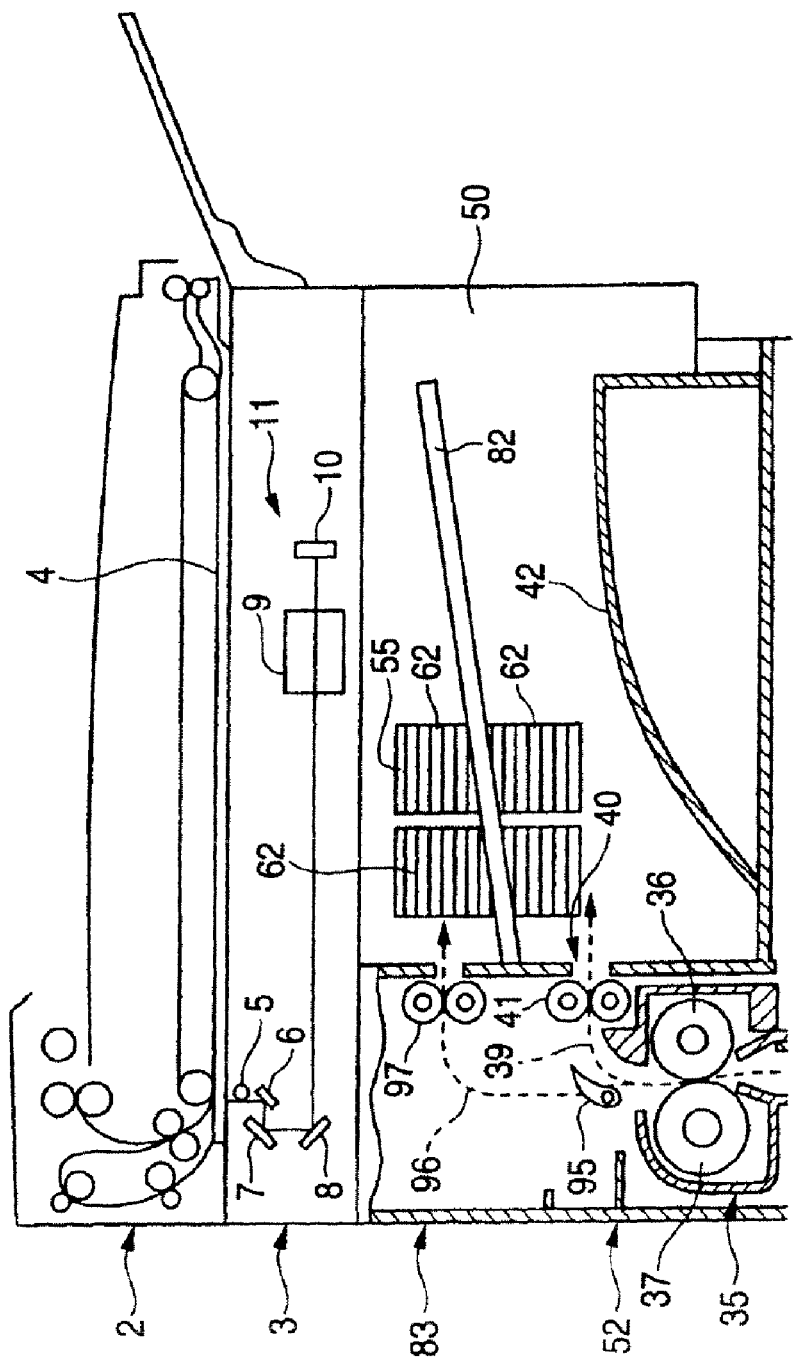
FIG. 17 is a schematic configuration view illustrating a black and white multifunction machine as an image forming apparatus according to a seventh exemplary embodiment of the invention.

Specifically, as shown in FIGS. 15 to 17, in the black and white multifunction machine according to the seventh exemplary embodiment, a switching lever 95 can switch the sheet transport path 39 between the first sheet ejection portion 40 and the second sheet ejection portion 83. The second sheet ejection portion 83 can eject the recording sheet 26 by sheet ejection rolls 97 through the second sheet transport path 96 onto the sheet ejection tray 82 of the second sheet ejection unit 83. Also, the second sheet ejection portion 83 is configured such that while the sheet ejection rolls 97 catch the rear end of the recording sheet 26 therebetween, the sheet ejection rolls 97 can be counterrotated to transport the recording sheet 26 along the second sheet transport path 96 in the opposite direction with the rear end of the recording sheet 26 being the leading edge and the switching lever 95 switches the transport path to eject the recording sheet 26 upside down on the sheet ejection tray 42.

In the seventh exemplary embodiment, as shown in FIG. 15, when the recording sheet 26 is temporarily ejected on the sheet ejection tray 82 before reversing it, the inlet 62 of the suctioning/exhausting unit 60 suctions and removes disagreeable odor and volatile organic compounds emitted from the recording sheet 26.

As shown in FIG. 16, a plurality of filters $67_1$ and $67_2$ with the same or different filtering characteristics may be located in tandem in the suctioning/exhausting unit 60.

Since other arrangements and effects of this exemplary embodiment are similar to those of the above embodiments, the description thereof will be omitted.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a recording-medium stacking portion provided in a body portion or an upper portion of the image forming apparatus, the recording-medium stacking portion that stacks recording media on which respective images are formed thereon;
   a recording-medium ejection portion that ejects the recording medium in a recording-medium ejection direction to the recording-medium stacking portion; and
   a suctioning/exhausting unit located with respect to the recording-medium stacking portion in a direction, which is perpendicular to the recording-medium ejection direction and parallel to a surface of the recording medium stacked on the recording-medium stacking portion, wherein
   the suctioning/exhausting unit includes an inlet on a rear side and an outlet on a back surface of the image forming apparatus,
   an axis perpendicular to the rear side is perpendicular to the recording-medium ejection direction, and
   the suctioning/exhausting unit suctions air emitted from the recording medium after the recording medium has passed through the recording-medium ejection portion.

2. The image forming apparatus according to claim 1, further comprising a filter.

3. The image forming apparatus according to claim 2, wherein
   the filter is disposed on a back surface of the image forming apparatus.

4. The image forming apparatus according to claim 2, wherein
   the filter is a deodorant filter.

5. The image forming apparatus according to claim 2, wherein
   the filter is an absorption or degradation filter of volatile organic compounds.

6. The image forming apparatus according to claim 2, wherein
   the filter is formed from two pieces of filter.

7. The image forming apparatus according to claim 1, wherein
   the inlet is disposed on a part of a casing of the image forming apparatus, the part being perpendicular to the recording-medium ejection direction.

8. The image forming apparatus according to claim 1, wherein
   the inlet is located on a surface that is perpendicular to both a surface of the recording-medium ejection portion and a surface of the recording-medium stacking portion.

9. The image forming apparatus according to claim 1, wherein
   a length from an opening of the recording-medium ejection portion to a far end of the inlet in the recording-medium ejection direction is smaller than an entire length of the recording medium.

10. The image forming apparatus according to claim 1, wherein
    the inlet is provided to face the recording-medium stacking portion.

11. The image forming apparatus according to claim 1, wherein
    the inlet is provided at a side rear of the recording medium stacked on the recording-medium stacking portion such that, when the image forming apparatus is viewed from a front side, the inlet is located behind the recording medium stacked on the recording-medium stacking portion.

12. The image forming apparatus according to claim 1, wherein
    when the image forming apparatus is viewed from a front side, the inlet is provided at a wall at a far side of the recording medium stacked on the recording-medium stacking portion.

13. An image forming apparatus comprising:
    a recording-medium stacking portion provided in a body portion or an upper portion of the image forming apparatus, the recording-medium stacking portion that stacks recording media on which respective images are formed thereon;
    a recording-medium ejection portion that ejects the recording medium in a recording-medium ejection direction to the recording-medium stacking portion; and
    a suctioning/exhausting unit located with respect to the recording-medium stacking portion in a direction, which is perpendicular to the recording-medium ejection direction and parallel to a surface of the recording medium stacked on the recording-medium stacking portion, the suctioning/exhausting unit that includes an inlet on a rear side which is perpendicular to the recording-medium ejection direction of the recording-medium stacking portion and parallel to a surface of the recording-medium, and an outlet on a back surface of the image forming apparatus, wherein the suctioning/exhausting unit suctions air emitted from the recording medium, which is ejected from the recording-medium ejection portion onto the recording-medium stacking portion, the suctioning/exhausting unit is disposed downstream from the recording-medium ejection portion in a recording-medium traveling direction, and the suctioning/exhausting unit suctions air emitted from the recording medium after the recording medium has passed through the recording-medium ejection portion.

14. The image forming apparatus according to claim 13, wherein
the inlet is provided to face the recording-medium stacking portion.

15. The image forming apparatus according to claim 13, wherein
the inlet is provided at a side rear of the recording medium stacked on the recording-medium stacking portion such that, when the image forming apparatus is viewed from a front side, the inlet is located behind the recording medium stacked on the recording-medium stacking portion.

16. The image forming apparatus according to claim 13, wherein
when the image forming apparatus is viewed from a front side, the inlet is provided at a wall at a far side of the recording medium stacked on the recording-medium stacking portion.

* * * * *